United States Patent [19]
Guyt

[11] Patent Number: 6,041,370
[45] Date of Patent: Mar. 21, 2000

[54] FIFO USING A FADING ONES COUNTER

[75] Inventor: Charles B. Guyt, Hillsboro, Oreg.

[73] Assignee: Intel Corporation, Santa Clara, Calif.

[21] Appl. No.: 08/986,502

[22] Filed: Dec. 8, 1997

[51] Int. Cl.[7] .................................................. G06F 13/00
[52] U.S. Cl. ................................................ 710/57; 710/57
[58] Field of Search .......................................... 710/52–57

[56] References Cited

U.S. PATENT DOCUMENTS

| | | | |
|---|---|---|---|
| 5,305,253 | 4/1994 | Ward ........................................... | 365/73 |
| 5,426,756 | 6/1995 | Shyi et al. ................................ | 395/425 |
| 5,471,583 | 11/1995 | Au et al. .................................... | 395/250 |
| 5,555,524 | 9/1996 | Castellano ................................ | 365/221 |
| 5,590,366 | 12/1996 | Bryant et al. ............................ | 395/800 |
| 5,712,992 | 1/1998 | Hawkins et al. ......................... | 395/877 |
| 5,898,893 | 4/1999 | Alfke ........................................ | 395/877 |

*Primary Examiner*—Ayaz R. Sheikh
*Assistant Examiner*—David A. Wiley
*Attorney, Agent, or Firm*—Kenyon & Kenyon

[57] ABSTRACT

A method and apparatus for encoding a count value wherein a single bit changes between consecutive count values. A bit field is scanned for bits set to one. If a single bit has been set to one, a first bit adjacent to the single bit is set to one. If more than one bit has been set to one, a second bit adjacent to the single bit is set to zero.

21 Claims, 3 Drawing Sheets

FIFO USING A FADING ONES COUNTER

FIELD OF THE INVENTION

The invention relates to counters in general. More particularly, the invention relates to a fading ones counter which is especially useful in a first-in-first-out (FIFO) memory.

BACKGROUND OF THE INVENTION

A FIFO is a memory unit that stores information (referred to as "data items") in such a manner that the data item first in is the data item first out. By way of analogy, an example of a FIFO would be a check-out line at a retail store, wherein the first person to stand in line to purchase goods is the first to be serviced by a cashier.

A FIFO utilizes counters to keep track of data items stored in the FIFO. A FIFO uses a write counter to hold the address for a memory write operation, and a read counter to hold the address for a read operation. Each counter utilizes a count encoding/decoding technique to generate count values. Thus, a write counter generates a write count value, and a read counter generates a read count value.

A FIFO typically compares the write and read count values to determine whether the FIFO is empty or full. The FIFO can accomplish this in a number of different ways. For example, assume a FIFO has six positions numbered 1 through 6. Further assume that positions 1, 2 and 3 are filled with data items. The write counter would be 4 indicating the next position to place a data item in the FIFO. Now assume that data items 1 and 2 were read from the FIFO. The read counter would be 3 indicating the next position to read a data item from the FIFO. The FIFO circuit subtracts the read counter value of 3 from the write counter value of 4 to determine the number of data items left unread from the FIFO, which is 1. Consequently, the FIFO knows that there are 5 positions available in the FIFO to store incoming data items.

The comparison of count values to determine full and empty states of the FIFO is typically accomplished by sending the write count value to the read counter, and vice-versa. This transfer of count values, however, can lead to a problem for some FIFOs. One such FIFO is referred to as a "dual synchronous FIFO."

In a dual synchronous FIFO a problem occurs in comparing a write count value with a read count value. A dual synchronous FIFO utilizes a separate clock signal for each counter. Thus, when comparing count values, a situation arises wherein a count value is generated in one clock domain, and is subsequently sampled in a second clock domain. This asynchronous sampling of count values increases the possibility that the sampling circuit might have the wrong count value due to metastability in the circuit.

Accordingly, conventional dual synchronous FIFOs utilize a count encoding technique ensuring that only one bit changes between consecutive counts to minimize metastability. This count encoding technique is referred to as "Grey encoding/decoding" (Grey encoding). A counter using Grey encoding is typically referred to as a "Grey counter."

The Grey counter, however, is less than satisfactory for a number of reasons. For example, a Grey counter requires complex gating in the underlying hardware. This limits the operational speed of the Grey counter, and therefore the speed at which a device using the FIFO can operate. Further, a Grey counter can only be used for FIFO lengths of $2^N$. Thus, for example, a FIFO needed to hold a maximum of 56 data items would have to be allocated 64 data storage registers in order to use a Grey counter. This leads to inefficient use of computer memory.

In view of the foregoing, it can be appreciated that a substantial need exists for a FIFO using a counter that ensures only one bit changes between consecutive count values, and solving the above-discussed problems.

SUMMARY OF THE INVENTION

The present invention includes a method and apparatus for encoding a count value wherein a single bit changes between consecutive count values. A bit field is scanned for bits set to one. If a single bit has been set to one, a first bit adjacent to the single bit is set to one. If more than one bit has been set to one, a second bit adjacent to the single bit is set to zero.

DETAILED DESCRIPTION

The present invention includes a method and apparatus for implementing a read and write counter for a dual synchronous FIFO. One embodiment of the invention utilizes an encoding/decoding technique referred to as "fading ones encoding/decoding" (fading ones encoding) to increment a counter referred to as a "fading ones counter." A fading ones counter can be used for both the read and write counters used to manage a FIFO.

The fading ones encoding technique ensures that only a single bit changes between consecutive counts. This is particularly useful for dual synchronous FIFOs where separate clocks are used for the read and write counters. Further, the fading ones encoding/decoding technique simplifies both the count generation and count evaluation procedures used to manage a FIFO, thereby increasing the speed at which a computer can load and execute an application.

Figure 1:
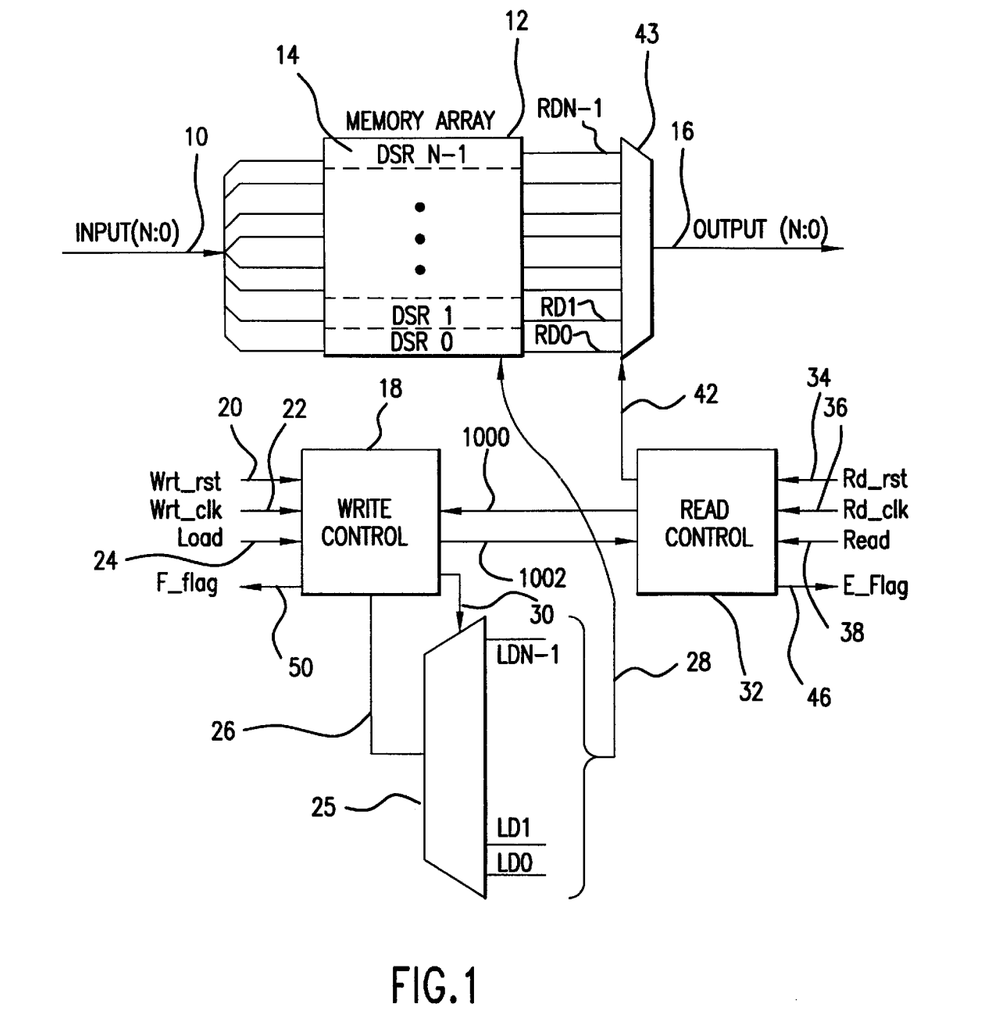
FIG. 1 is a block diagram of a FIFO suitable for practicing one embodiment of the present invention.

Referring now in detail to the drawings wherein like parts are designated by like reference numerals throughout, there is illustrated in FIG. 1 a block diagram of a FIFO suitable for practicing one embodiment of the present invention. FIG. 1 shows a FIFO 60, which is a dual synchronous FIFO having read and write clock domains asynchronous with respect to each other. FIFO 60 includes separate read and write control circuits, and a memory array for the storage of data.

As shown in FIG. 1, an input line 10 is connected to a memory array 12. Memory array 12 is comprised of data storage registers (DSR) ranging from DSR 0 to DSR N−1, with each DSR having an input line and an output line. Each DSR input line is coupled to a demultiplexer 25, and each DSR output line is coupled to a multiplexer 43. Further, a write control circuit 18 is coupled to demultiplexer 25, and a read control circuit 32 is coupled to multiplexer 43.

Write control 18 accepts input signals from lines 20, 22, 24, and line 1000. Write control 18 outputs signals to demultiplexer 25 using lines 26 and 30, and to read control 32 using line 1002. Read control 32 accepts input signals from lines 34, 36, 38 and 1002. Read control 32 outputs signals to multiplexer 43 using line 42, and to write control 18 using line 1000.

Figure 2:
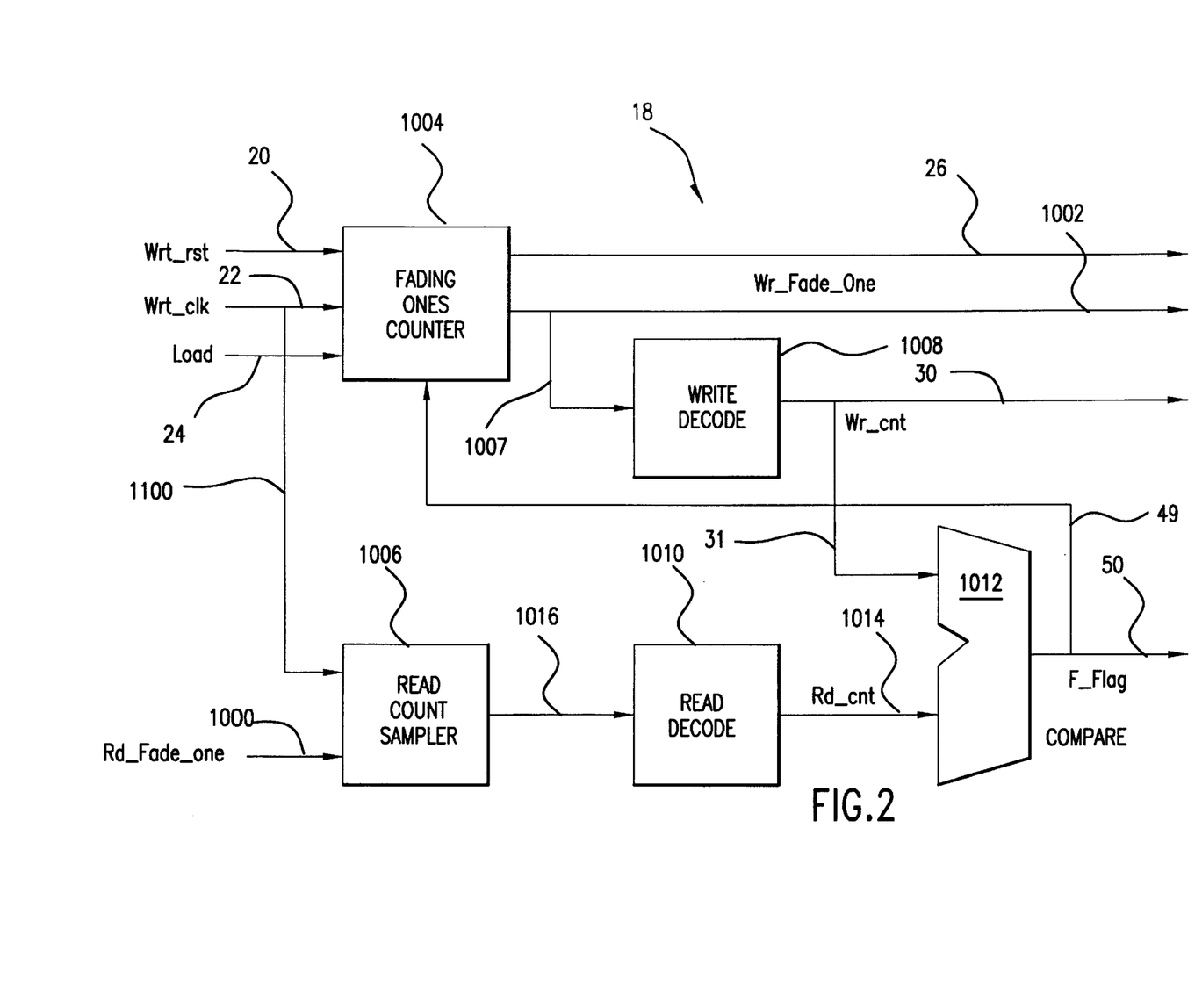
FIG. 2 is a block diagram of a write control circuit suitable for practicing one embodiment of the invention.

FIG. 2 is a block diagram of a write control circuit suitable for practicing one embodiment of the invention. Write control 18 is comprised of a fading ones counter 1004, a write decoder 1008, a comparator 1012, a read count sampler 1006, and a read decoder 1010.

Fading ones counter 1004 accepts signals from input lines 20, 22, 24 and 49, and outputs signals to demultiplexer 25, write decoder 1008, and read control 32 using lines 26, 1007 and 1002, respectively.

Write decoder 1008 accepts input signals over line 1007. Write decoder 1008 also outputs signals to demultiplexer 25 and comparator 1012 over lines 30 and 31, respectively.

Read count sampler 1006 accepts input signals over line 1000 from read control circuit 32, and also over line 1100 from a write clock that generates a write clock signal (WRT_CLK). Read count sampler 1006 outputs a signal to read decoder 1010 over line 1016.

Read decoder 1010 accepts input signals over line 1016. Read decoder 1010 also outputs signals to comparator 1012 over line 1014.

Figure 3:
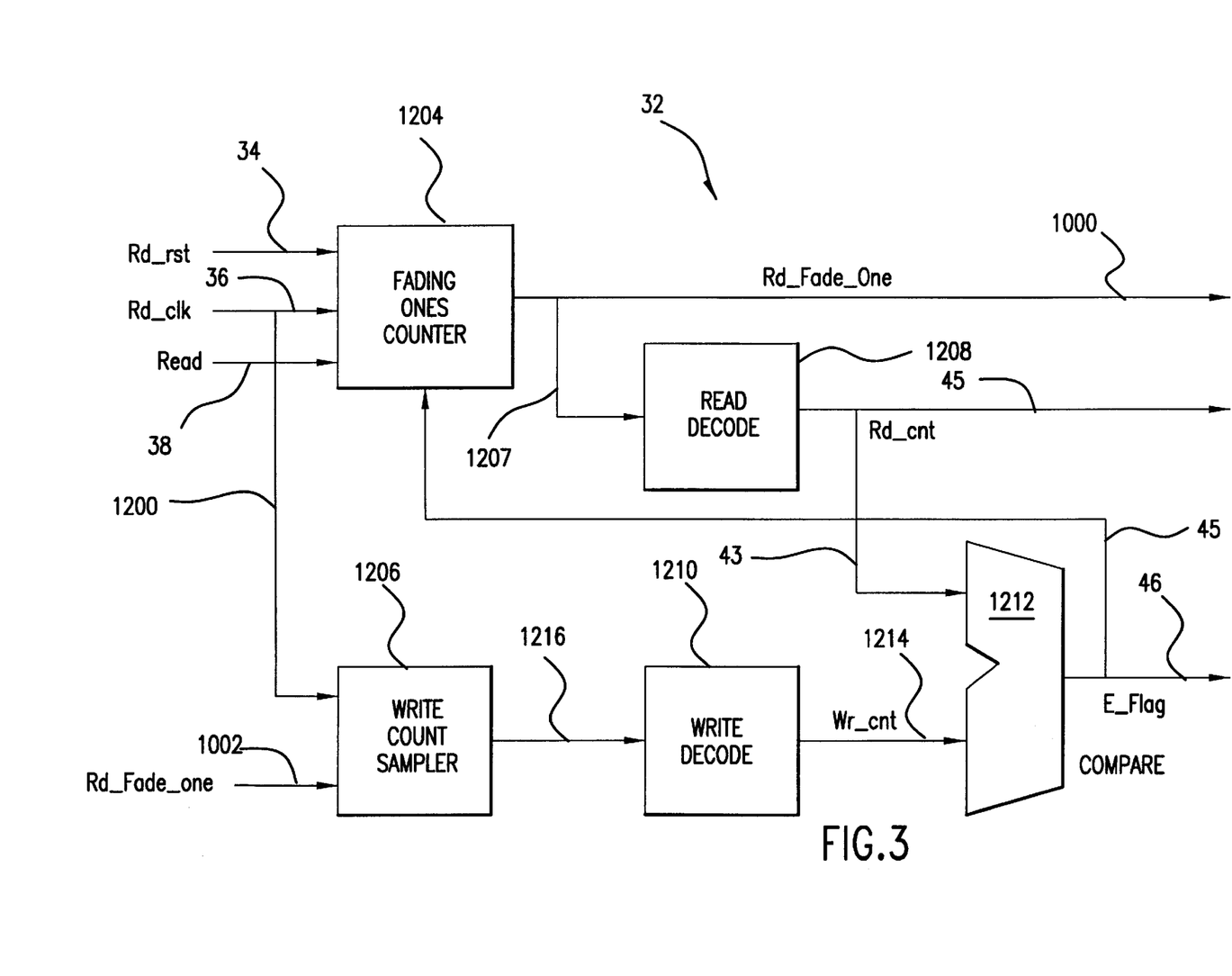
FIG. 3 is a block diagram of a read control circuit suitable for practicing one embodiment of the invention.

FIG. 3 is a block diagram of a read control circuit suitable for practicing one embodiment of the invention. Read control 32 is comprised of a fading ones counter 1204, a read decoder 1208, a comparator 1212, a write count sampler 1206, and a write decoder 1210.

Fading ones counter 1204 accepts signals from input lines 34, 36, 38 and 45. Fading ones counter 1204 outputs signals to read decoder 1208 and write control 18 using lines 1207 and 1000, respectively.

Read decoder 1208 accepts input signals over line 1207. Read decoder 1208 also outputs signals to multiplexer 43 and comparator 1212 over lines 42 and 43, respectively.

Write count sampler 1206 accepts input signals over line 1002 from write control circuit 18, and also over line 1200 from a read clock that generates a RD_CLK signal. Write count sampler 1206 outputs a signal to write decoder 1210 over line 1216.

Write decoder 1210 accepts input signals over line 1216. Read decoder 1210 also outputs signals to comparator 1212 over line 1214.

The operation of FIFO 60 as described with reference to FIGS. 1, 2 and 3 will be discussed in more detail as follows. It is worth noting that the operation of write control circuit 18 and read control circuit 32 are similar. As a result, the description with respect to write control circuit 18 applies to read counter circuit 32, and vice-versa.

FIFO 60 operates as follows. A LOAD signal is received by write control 18 over line 24 indicating data items are to be written to memory array 12. If write control 18 has not received a write reset signal (WRT_RST) over line 20, nor a full flag signal (F_FLAG) over line 49 (shown in FIG. 2), then write control 18 asserts line 26. Line 26 is the control line for demultiplexer 25. If line 26 is asserted, demultiplexer 25 is enabled. Write control 18 also generates a write count signal (WR_CNT), which is received by demultiplexer 25 over line 30. Thus, if write control 18 asserts line 26, demultiplexer 25 selects a line from a group of lines designated LD0 to LDN-1 corresponding to WR_CNT received over line 30. The selected line causes a write to the selected location in memory array 12. At the same time, i.e., on the same clock edge, fading ones counter 1004 is incremented to its next state.

The operations for read control circuit 32 are similar to those of write control circuit 18. In read control circuit 32, however, read data is unconditionally sent to multiplexer 43 whether or not a read signal is received by read control 32 over line 38. If a READ signal is received by read control 32 over line 38, and read control circuit 32 has not received a read reset signal (RD_RST) over line 34 nor a empty flag signal (E_FLAG) over line 45 (shown in FIG. 3), then read control circuit 32 is incremented to its next read count value (RD_CNT) or state, and sends RD_CNT to multiplexer 43 over line 42. Multiplexer 43 then selects a line from lines RD0 to RDN-1 corresponding to RD_CNT. The selected line causes a read from the selected location in memory array 12. At the same time, i.e., on the same clock edge, fading ones counter 1204 is incremented to its next state whenever line 38 is asserted and fading ones counter 1204 has not received a RD_RST signal over line 34 nor a E_FLAG signal over line 45 (shown in FIG. 3).

Write control circuit 18 generates the F_FLAG signal as follows. Comparator 1012 compares WR_CNT and RD_CNT. Comparator 1012 sets the F_FLAG whenever a write occurs and the read pointer is less than the write pointer using modulo n arithmetic.

More particularly, F_FLAG is set whenever write control 18 is pointing to a location in memory array 12 that is one less than the location in memory array 12 pointed to by read control 32. Three events occur on the same clock edge prior to F_FLAG being set: (1) a data item is written to the last available location in memory array 12 pointed to by WR_CNT; (2) fading ones counter 1004 is incremented to point to the next location in memory array 12, which is the same location the delayed read pointer is selecting; and (3) the F_FLAG is set to inhibit further writing. F_FLAG is reset whenever write control circuit 18 recognizes that read control circuit 32 has incremented RD_CNT and is now pointing to the next location in memory array 12, thus allowing write operations to continue.

Write control circuit 18 generates WR_CNT value as follows. Fading ones counter 1004 periodically sends an incremented fading ones encoded count value (WR_FADE_ONE) to read control circuit 32 over line 1002. WR_FADE_ONE is also sent to write decoder 1008 over line 1007. Write decoder 1008 decodes WR_FADE_ONE into a binary equivalent of WR_FADE_ONE (WR_CNT), and sends WR_CNT to comparator 1012 over line 32.

Write control circuit 18 generates RD_CNT as follows. Read count sampler 1006 receives a fading ones encoded count value (RD_FADE_ONE) from read control circuit 32. Read counter sampler 1006 performs two-stage sampling to reduce metastability, using WRT_CLK received over line 1100. The sampled signal from read count sampler 1006 is sent to read decoder 1010 over line 1016. Read decoder 1010 decodes RD_FADE_ONE into a binary equivalent of RD_FADE_ONE (RD_CNT), and sends RD_CNT to comparator 1012 over line 1014.

It is worth noting that the propagation delay and sampling steps occurring in and between write control 18 and read control 32 affects synchronization between the two circuits. For example, in write control 18, the synchronized RD_CNT received over line 1014 is inexact since the sampling that occurs in read count sampler 1006 delays the read count by 1 to 2 WRT_CLK times. This means that after a read has occurred, the data register in memory array 12 where the data item was read is not recognized as being available for writing for 1 or 2 write clocks. Similarly, in read control 32, the synchronized WR_CNT received over line 1214 is inexact since the sampling that occurs in write count sampler 1206 delays the write count by 1 to 2 RD_CLK times. This means that after a write has occurred to memory array 12, it is not recognized as being available for reading for 1 or 2 read clocks.

Comparator 1012 takes WR_CNT and compares it with RD_CNT to determine how many data storage registers of memory array 12 are available for storing incoming data items. If there are no available data storage registers in memory array 12, comparator 1012 sends an F_FLAG signal over lines 49 and 50, thus preventing any more data items from being stored in memory array 12.

Read control circuit 32 generates an empty flag signal (E_FLAG) using operations similar to write control circuit 18. Read control circuit 32, however, does not have an equivalent to line 26. This is because read data is always present on line 16. Having read data always present at the output allows for immediate use of the data, while read control line 38 causes fading ones counter 1204 to increment to the next count value or state. Further, comparator 1212 sets an empty flag when a read occurs and the RD_CNT is equal to FWR_CNT.

Fading ones counter 1004 and fading ones counter 1204 utilize a fading ones encoding technique for generating count values. The fading ones encoding technique ensures that a single bit changes between consecutive counts. A fading ones counter accomplishes this by having an encoded count value that has one or two adjacent bits set to one (1) at any time, including the wrap from element N to element zero (0). All other bits of the encoded count value are zero (0).

It is worth noting that the term "adjacent bits" as used herein means bits next to one another in a bit field. Thus if a bit field uses 8 bits labeled bits 0 through 7, then bits adjacent to bit 4 would include bits 3 and 5. The term "adjacent bits" also includes the wrap from the most significant bit (MSB) to the least significant bit (LSB). Consequently, the MSB in a bit field is considered to be adjacent to the LSB, and vice-versa. In the above example, if a bit field uses 8 bits labeled bits 0 through 7, with bit 0 being the LSB and bit 7 being the MSB, then bits adjacent to bit 0 would be bit 1 and bit 7. Similarly, bits adjacent to bit 7 would be bit 6 and bit 0.

Table 1 illustrates an example of count values from N to 13 encoded in accordance with one embodiment of the invention.

TABLE 1

| N | Encoding | Representation |
|---|---|---|
| 0 | 0000001 | 2 ** 0 |
| 1 | 0000011 | 2 ** 1 + 2 ** 0 |
| 2 | 0000010 | 2 ** 1 |
| 3 | 0000110 | 2 ** 2 + 2 ** 1 |
| 4 | 0000100 | 2 ** 2 |
| 5 | 0001100 | 2 ** 3 + 2 ** 2 |
| 6 | 0001000 | 2 ** 3 |
| 7 | 0011000 | 2 ** 4 + 2 ** 3 |
| 8 | 0010000 | 2 ** 4 |
| 9 | 0110000 | 2 ** 5 + 2 ** 4 |
| 10 | 0100000 | 2 ** 5 |
| 11 | 1100000 | 2 ** 6 + 2 ** 5 |
| 12 | 1000000 | 2 ** 6 |
| 13 | 1000001 | 2 ** 0 + 2 ** 6 |

As shown in Table 1, N represents a count value from 0 to 13. The column under the heading "Encoding" shows the fading ones encoded count value. In this example, there are 7 bits used in the count encoding field, with each bit labeled bit 0 to bit 6 from the least significant bit to the most significant bit, respectively. The column under the heading "Representation" is the mathematical expression that converts the value N into a fading ones encoded count value. For example, the binary value for N=1 can be generated by calculating a value for $2^1 + 2^0$, which is 3. The value 3 converted to binary is "0000011."

A fading ones counter has the following limitations. First, a fading ones counter encodes a count value using at least N/2 bits, where N is the maximum amount of count values. Thus, for example, a counter where N=14 encodes each count value using at least 7 bits. Second, a counter must encode a count value using a minimum of 3 bits. Finally, a fading ones counter requires that N is an even number.

A fading ones counter encodes a count value such that only a single bit changes between successive count values. The encoding may be represented in closed form via the following expressions. If N is even, the encoding can be represented by $2^{(N/2)}$ bits. If N is odd, the encoding can be represented by $2^{((N-1)/2)} + 2^{(N+1) \bmod (Nmax+1)/2)}$ bits.

The logic modules for fading ones counters 1004 and 1204, write decoder 1008, and read decoder 1208, are represented using the following algorithm set forth in Very High Speed Integrated Circuits (VHSIC) Hardware Description Language (VHDL). It is worth noting that a conventional synthesis tool must be used to generate a netlist of logical elements and their interconnection. The VHDL code is a convenient way of describing the logic modules that will be generated by the synthesis tool. Further, although a specific VHDL algorithm is set forth for this embodiment of the invention, any algorithm or circuit implementing the functionality necessary for a fading ones counter falls within the scope of the invention.

```
PROCEDURE fade_left  (pntr : INOUT  UNSIGNED;
                      cntr : OUT    NATURAL) IS
    VARIABLE first_one      : NATURAL;
    VARIABLE add_one        : NATURAL    : = 0;
    CONSTANT msb            : NATURAL    : = pntr'HIGH;
BEGIN
    FOR i IN 0 TO msb LOOP
        IF pntr(i) = 'i' THEN
            first_one := i;
            EXIT;
        END IF;
    END LOOP;
    IF first_one = 0 THEN
        IF pntr(msb) = '1' THEN
            pntr(msb) := '0' ;
        ELSIF pntr(1) = '1' THEN
            pntr(0) := '0' ;
            first_one := 1;
        ELSE
            pntr(1) := '1';
            add_one := 1;
        END IF;
    ELSIF first_one = msb THEN
        pntr(0) :='1';
        add_one := 1;
    ELSE
        IF pntr (first_one + 1) = '1' THEN
            pntr(first_one) := '0';
            first_one := first_one + 1;
        ELSE
            pntr(first_one + 1) := '1' ;
            add_one := 1;
        END IF;
    END IF;
    cntr := first_one * 2 + add_one
END fade_left;
```

As shown in the above algorithm, the assignment of the constant MSB is taken from the input encoded value called PNTR. PNTR is a fading ones encoded value that will be passed to the algorithm and be modified by the algorithm. Field width is determined by the algorithm from the width of the field passed to the algorithm. It is worth noting that this algorithm can be re-used for any PNTR width without modification. It is also worthy to note that the count returned is a non-negative integer of TYPE NATURAL. Thus, RD_CNT and WR_CNT are NATURAL numbers, and are later synthesized to a binary representation in the actual logic. This count is the count value used as an index into the memory array used in the FIFO.

The variable FIRST_ONE is used to indicate the position of the first bit equal to 1 in PNTR. The variable ADD_ONE is set to 1 when two bits are set in the next PNTR. The algorithm scans through the bits for a current encoded count value until a bit set to 1 is found. If the first bit set to 1 is the LSB, then the current encoded count value represents three possible count values (NLSB refers to Next LSB):

1. It is the maximum value (Nmax) wrapping to zero (MSB=1, NLSB=0, LSB=1);
2. It is the zero value going to the 1 value (MSB=0, NLSB=0, LSB=1) or;
3. It is the one value going to a 2 value (MSB=0, NLSB=1, LSB=1).

If the MSB is set to 1, then the current encoded count value is equal to Nmax and is wrapping around to go back to a 0 value. If the MSB is not 1 and the NLSB is set to 1, then the next encoded count value is set to a value of 2. If the MSB is not 1 and the NLSB is not set to 1, then the next encoded count value is set to the value of 1.

If FIRST_ONE is the MSB, the next encoded count value is set to the value of Nmax. If neither the LSB nor MSB are 1, the algorithm determines if the next most significant bit (NMSB) is a 1. If the NMSB is a 1, the algorithm resets the current bit to 0 and increments the value of FIRST_ONE. If the NMSB is not set to 1, then the algorithm sets the next bit and the add one bit FIRST_ONE. The counter value is computed based on the first position where a 1 is found and when the next position is also a 1.

Read decode 1010 and write decode 1210 can decode a fading ones encoded count value using the following VHDL algorithm. This algorithm derives a NATURAL number for the compare function. Again, the synthesis tool knows how to map this NATURAL number into a binary decoded value being represented in logic.

```
PROCEDURE eval_pntr (pntr : IN      UNSIGNED;
                     cntr : OUT     NATURAL) IS
   VARIABLE  first_one    : NATURAL;
   VARIABLE  add_one      : NATURAL    := 0;
   CONSTANT  msb          : NATURAL    := pntr' HIGH;
BEGIN
   FOR i IN 0 TO msb LOOP
      IF pntr(i) = '1' THEN
         first_one := i;
         EXIT;
      END IF;
   END LOOP;
   IF first_one = 0 THEN
      IF pntr(msb) = '1' THEN
         add one := 1;
         first_one := msb;
      ELSIF pntr(1) = '1' THEN
         add_one := 1;
      END IF;
   ELSIF first_one = msb THEN
      NULL;
   ELSIF pntr(first_one+1) = '1' THEN
      add_one := 1;
```

```
   END IF;
   cntr := first_one * 2 + add_one;
END eval-pntr;
```

The above algorithm computes the current counter value CNTR from the current PNTR value. The current CNTR value is returned to the caller. The values returned are between zero and two times the PNTR field width. The algorithm first determines which bit is the first one set from the LSB to the MSB. The variable FIRST_BIT is assigned the value of its bit location from zero to MSB. It is worth noting that when both the MSB and LSB are set, the MSB is viewed to be the first bit set.

Whenever two bits are set, the variable ADD_ONE is set to 1, otherwise it is 0. The return value is two times the value of the first set bit plus the value of ADD_ONE. It is worth noting that the above algorithm is different from the previous algorithm in that it does not alter the value of the input PNTR and returns the current count instead of the next count.

Decoding for a fading ones counter can be represented using the following expressions. If N is even, then bit N/2 is ANDed with the complement of bit [(N/2)+1] MOD ((Nmax+1)/2). If N is odd, then bit (N−1)/2 is ANDed with bit [(N+1)/2] MOD ((Nmax+1)/2). Further, it is possible to generate a binary count equivalent from a fading ones counter using the following method:

1. The FIFO element pointed to is calculated by scanning for the first one from the least significant bit of the count encoding field; and
2. Once the bit position for the first one is located, the bit position is multiplied by 2 and the next most significant bit value, using modulo arithmetic, is added to it.

The result of steps 1 and 2 is a binary representation of length $Log_2 N$.

In another embodiment of the invention, the fading ones encoding technique can be implemented as a fading zeroes encoding technique. Fading zeroes encoding would be the inverse of fading ones encoding.

In yet another embodiment of the invention, the fading ones encoding and fading zeroes encoding techniques could be implemented by reversing the shift order so that the one or zero is shifted to the right (towards the LSB) rather than the left (towards the MSB).

Although various embodiments are specifically illustrated and described herein, it will be appreciated that modifications and variations of the present invention are covered by the above teachings and within the purview of the appended claims without departing from the spirit and intended scope of the invention. For example, although a fading ones counter was used with a dual synchronous FIFO, it can be appreciated that any structure requiring the functionality provided by a fading ones counter falls within the scope of the invention.

What is claimed is:

1. A method for determining a total number of data items stored in a FIFO, comprising the steps of:

encoding a current first count value by changing one of two adjacent bits within a bit field representing a previous first count value, with said adjacent bits both comprising a first value or said first value and a second value, and with all other bits in said bit field having said second value;

receiving a current second count value encoded by changing one of two adjacent bits within a bit field representing a previous second count value, with said adjacent bits both comprising said first value or said first value and said second value, and with all other bits in said bit field having said second value; and comparing said current count values.

2. The method of claim 1, wherein said current second count value is encoded using a first clock signal and said current first count value is encoded using a second clock signal.

3. The method of claim 2, wherein said step of comparing comprises the steps of:

decoding said current first count value into a first binary value;

sampling said received second count value using said second clock signal;

decoding said sampled second count value into a second binary value; and comparing said first and second binary values.

4. The method of claim 1, further comprising the steps of generating a full flag to indicate the FIFO is full, and an empty flag to indicate the FIFO is empty.

5. The method of claim 1, wherein in said encoding step, said count values are encoded using at least three bits.

6. The method of claim 1, wherein in said encoding and receiving steps, a maximum value for said count values is an even number.

7. The method of claim 6, wherein in said encoding and receiving steps, said maximum value is represented by Nmax, and said count values are encoded using Nmax/2 bits.

8. The method of claim 1, wherein said step of encoding comprises the steps of:

scanning said bit field for bits set to one;

determining whether a single bit has been set to one, and if so, setting a first bit adjacent to said single bit to one, and if not, setting a second bit adjacent to said single bit to zero.

9. The method of claim 1, wherein said step of encoding comprises the steps of:

scanning said bit field for bits set to zero;

determining whether a single bit has been set to zero, and if so, setting a bit adjacent to said single bit to zero, and if not, setting a bit adjacent to said single bit to one.

10. The method of claim 1, wherein said first count value is a write count value, and said second count value is a read count value.

11. A FIFO comprising:

a write control including a fading ones write counter, said write control having a write output, a control output, a write count output, and a read count input;

a demultiplexer having a write input coupled to said write output, a control input coupled to said control output, and a plurality of load outputs;

a memory array having a plurality of load inputs coupled to said load outputs, and a plurality of read outputs;

a multiplexer having a plurality of read inputs coupled to said read outputs, and a read data input;

a read control including a fading ones read counter, said read control having a read data output coupled to said read data input, a write count input coupled to said write count output, and a read count output coupled to said read count input.

12. The FIFO of claim 11, wherein said write control circuit further comprises a write reset input, a write clock input, a write load input, and a full flag output, and said read control circuit further comprises a read reset input, a read clock input, a read input, and an empty flag output.

13. The FIFO of claim 12, wherein said write control circuit comprises:

said write counter having a write counter reset input, a write counter clock input, a write counter load input, a write counter count output, and a write counter full flag input;

a first write decoder having a first write decoder input coupled to said write counter count output, and a first write decoder output;

a write comparator having a first write comparator input coupled to said first write decoder output, a write comparator full flag output coupled to said write counter full flag input, and a second write comparator input;

a first read decoder having a first read decoder output coupled to said second write comparator input, and a first read decoder input; and a read count sampler having a read count sampler output coupled to said first read decoder input, and a read count sampler input coupled to said read count output.

14. The FIFO of claim 13, wherein said read control circuit comprises:

said read counter having a read counter reset input, a read counter clock input, a read counter read input, a read counter count output, and a read counter empty flag input;

a second read decoder having a second read decoder input coupled to said read counter count output, and a second read decoder output;

a read comparator having a first read comparator input coupled to said second read decoder output, a read comparator empty flag output coupled to said read counter empty flag input, and a second read comparator input;

a second write decoder having a second write decoder output coupled to said second read comparator input, and a second write decoder input; and a write count sampler having a write count sampler output coupled to said second write decoder input, and a write count sampler input coupled to said write count output.

15. The FIFO of claim 14, wherein said read and write counters comprise:

means for scanning a bit field for bits set to one;

means for determining whether a single bit has been set to one, and if so, setting a first bit adjacent to said single bit to one, and if not, setting a second bit adjacent to said single bit to zero.

16. The FIFO of claim 14, wherein said read and write counters comprise:

means for scanning a bit field for bits set to zero;

means for determining whether a single bit has been set to zero, and if so, setting a bit adjacent to said single bit to zero, and if not, setting a bit adjacent to said single bit to one.

17. The FIFO of claim 11, wherein the FIFO is a dual synchronous FIFO.

18. A method for encoding a count value wherein a single bit changes between consecutive count values, comprising the steps of:

scanning a bit field for bits set to one;

determining whether a single bit has been set to one, and if so, setting a first bit adjacent to said single bit to one, and if not, setting a second bit adjacent to said single bit to zero.

19. A method for encoding a count value wherein a single bit changes between consecutive count values, comprising the steps of:

scanning a bit field for bits set to zero;

determining whether a single bit has been set to zero, and if so, setting a bit adjacent to said single bit to zero, and if not, setting a bit adjacent to said single bit to one.

20. A fading ones counter, comprising:

a first logic module for scanning a bit field for bits set to one;

a second logic module for determining whether a single bit has been set to one, and if so, setting a first bit adjacent to said single bit to one, and if not, setting a second bit adjacent to said single bit to zero.

21. A fading ones counter, comprising:

a first logic module for scanning a bit field for bits set to zero;

a second logic module for determining whether a single bit has been set to zero, and if so, setting a bit adjacent to said single bit to zero, and if not, setting a bit adjacent to said single bit to one.

* * * * *

UNITED STATES PATENT AND TRADEMARK OFFICE
CERTIFICATE OF CORRECTION

PATENT NO. : 6,041,370
DATED : March 21, 2000
INVENTOR(S) : Charles B. Guy

It is certified that error appears in the above-identified patent and that said Letters Patent is hereby corrected as shown below:

Title page: [75] Inventor: Change "Guy t" to --Guy--.

| Column | Line | |
|---|---|---|
| 64 | 40 | Change "IF pntr(i) = 'i' THEN" to --IF pntr(i) = '1' THEN--. |

Signed and Sealed this

Third Day of April, 2001

Attest:

NICHOLAS P. GODICI

*Attesting Officer*     Acting Director of the United States Patent and Trademark Office